(12) United States Patent
Zulkowski et al.

(10) Patent No.: US 8,152,092 B2
(45) Date of Patent: Apr. 10, 2012

(54) AERIAL TRANSPORTER

(75) Inventors: Rolf Zulkowski, OT Zeesen (DE);
Jürgen Henk, OT Zeesen (DE); Carl Von Gablenz, Berlin (DE); Christoph Von Kessel, Kleinmachnow (DE)

(73) Assignee: Delcon Deutsche Luftfahrt Consult GmbH, Wildau (DE)

( * ) Notice: Subject to any disclaimer, the term of this patent is extended or adjusted under 35 U.S.C. 154(b) by 853 days.

(21) Appl. No.: 12/095,385

(22) PCT Filed: Dec. 6, 2006

(86) PCT No.: PCT/EP2006/011702
§ 371 (c)(1),
(2), (4) Date: Oct. 9, 2008

(87) PCT Pub. No.: WO2007/065649
PCT Pub. Date: Jun. 14, 2007

(65) Prior Publication Data
US 2009/0078818 A1    Mar. 26, 2009

(30) Foreign Application Priority Data
Dec. 6, 2005   (DE) .......................... 10 2005 058 352

(51) Int. Cl.
*B64B 1/02* (2006.01)
(52) U.S. Cl. ................. 244/30; 244/31; 244/24
(58) Field of Classification Search .............. 244/115, 244/30, 31, 24
See application file for complete search history.

(56) References Cited

U.S. PATENT DOCUMENTS

| | | | | |
|---|---|---|---|---|
| 4,259,776 A * | 4/1981 | Roda | ............... | 29/423 |
| 5,080,302 A * | 1/1992 | Hoke | ............... | 244/31 |
| 5,906,335 A * | 5/1999 | Thompson | ............... | 244/96 |
| 6,010,093 A * | 1/2000 | Paulson | ............... | 244/24 |
| 6,224,015 B1 * | 5/2001 | Reinhard | ............... | 244/24 |
| 6,609,945 B2 * | 8/2003 | Jimenez et al. | ............... | 446/454 |
| 6,648,272 B1 * | 11/2003 | Kothmann | ............... | 244/97 |
| 7,334,757 B2 * | 2/2008 | Steinkerchner et al. | ...... | 244/115 |
| 2003/0207164 A1 * | 11/2003 | McElroy et al. | ............... | 429/26 |
| 2004/0155149 A1 * | 8/2004 | Dossas et al. | ............... | 244/128 |

FOREIGN PATENT DOCUMENTS

| | | |
|---|---|---|
| DE | 98580 | 8/1895 |
| DE | 231266 | 10/1908 |
| DE | 236 587 | 7/1911 |
| DE | 251 657 | 10/1912 |
| DE | 42 18 239 C2 | 9/1993 |
| DE | 196 25 297 A1 | 1/1998 |
| DE | 199 11 617 A1 | 9/2000 |
| DE | 100 58 072 A1 | 6/2002 |
| DE | 100 07 293 A1 | 1/2003 |
| DE | 101 48 589 A1 | 4/2003 |
| DE | 102 10 540 A1 | 9/2003 |
| GB | 2 196 922 A | 5/1988 |
| GB | 2264 092 A | 8/1993 |

* cited by examiner

*Primary Examiner* — Tien Dinh
*Assistant Examiner* — Justin Benedik
(74) *Attorney, Agent, or Firm* — Paul & Paul (57) ABSTRACT

This invention relates to an aerial transporter comprising rigid cell structures which are covered with light materials as a skin, composed of modules. The invention aerial transporter represents some type of airship without a tail unit as well as an approximate balloon construction comprising a rigid structure and an independent drive unit. Said aerial transporter can transport loads in the range of about 20 t and more over short to medium distances using lighter-than-air technology while meeting air traffic regulations. Furthermore, the disclosed aerial transporter can be used as an air crane in the tied state.

9 Claims, 5 Drawing Sheets

AERIAL TRANSPORTER

This invention pertains to an aerial transporter composed of modules with rigid cell structures which are covered with a skin of light materials, similar to the known "Zeppelin."

The printed publication GB 2264 092 A discloses airships with drive units and gondolas. The description in the documents provides a brief overview of the diverse systems of rigid, semi-rigid, and non-rigid airships which can be steered, have drive units, and which have a gondola suspended under the gas-filled compartment.

Bock, Knauer give comprehensive theoretical descriptions on the state of the art in their book "Leichter als Luft, Transport- und Trägersysteme, Ballons, Lufschiffe, Pllattformen" [Lighter Than Air, Transport and Carrier Systems, Balloons, Airships, Platforms], Frankenschwelle Publishing House, Hildburghausen, 2003, Germany.

A special problem which can be solved by airships is the setting-down of a load on an exact spot. The patent literature contains a number of proposals in this regard, for example in German published patent applications DE 100 58 072 A1, DE 101 48 589 A1, DE 196 25 297 A1, which describe different ways of anchoring an airship to the ground during the exchange of a load. Recently, in addition to aerial transport of awkward and heavy loads, the idea has also been publicized of using balloons as assembly cranes, in which case these balloons are attached or made fast to at least three points on the ground like a tethered balloon in order to move the balloon, or rather the load suspended from it and to be transported, to a precise spot. German published patent applications DE 199 11 617 A1 and DE 102 10 540 A1 are examples of such publications.

The previous standard was a design which, for example, Graf Zeppelin had established with his "steerable aircraft." DE-PS 985 80 but also inventors who followed him, e.g. as described in German patents DE 236 587, DE 251 657, used a metal or wood frame with a repeating pattern which formed the exterior framework of the aircraft. This framework was covered with a gas-tight exterior skin or filled with gas-tight ballonets containing lifting gas.

It has already been proposed, in DE-PS 231 266, to make an airship from similar individual lifting units placed directly behind one another, in which case these individual lifting units are supposed to consist of pressurized tube-type tires for an airship that can be dismantled.

It has also already been proposed to use standardized modular components, for example in German publication DE 42 18 239 C2 in which a rigid airship made of a lattice fuselage is used in the keel area of which a payload space for the transport of goods and people is to be placed and suspended from the lattice fuselage, and into which space individual identical useful load pallets can be inserted.

In a theoretical work it is proposed in printed publication DE 100 07 293 A1 to build an airship out of modules in which case a correspondingly large number of lifting containers are placed beside and adjacent to one another and connected to one another in the longitude, width, and height of the airship for different purposes listed in that patent. How the steering function of such an airship is to be maintained or how the individual modules are to be designed is not disclosed. There is just as little discussion of how the problem of exchanging a load during loading and unloading is to be solved.

Consequently, the invention is based on the problem of proposing a rigid series-production airship which is capable of operating as a transporter and an assembly crane with good starting and landing capabilities.

In accordance with the invention this problem is solved by the features of Claims 1, 8, and 9. Further developments of the invention are described in the dependent claims.

The aerial transporter is based on known manufacturing processes and incorporates experience from the Zeppelin rigid airship design at the beginning of the $20^{th}$ century as well as the CargoLifter projects towards the end of the $20^{th}$ century. In this regard traditional techniques are realized with innovative technologies and materials if they offer the possibility of a quick certification of airworthiness. It can serve as a test vehicle for technologies and materials which are to be certified for the medium and long term.

The details, perspectives, and purposes of the invention shall be discussed in more detail using drawings and the following descriptions. The figures show as follows:

FIG. 1 a lateral view of the modules in sub-figures a)-c) and in a top view d) in accordance with FIG. 1b;

FIG. 2 a front view of modules in sub-figures a)-c) and a perspective top view of a module in accordance with FIG. 1c);

In contrast to the previous tentative developments (Zeppelin), the goal is to use hydrogen as lifting gas and, if appropriate, as fuel, in which case helium (He) may also be used as a bridge to certification of airworthiness.

In the first approximation, the aerial transporter is a rigid, powered balloon for crane flight and for freight transport. It can be implemented in a modular design for diverse loads or tasks and can be powered with hydrogen both as lifting gas and fuel. The flight can be manned or unmanned, automatic or radio-controlled. The crane function can be implemented with the lifting unit being tied down, the crane being operated directly from the ground by means of radio-control. The aerial transporter is intended for use as a load transporter for short or medium distances of approximately 1,000 km or more. This avoids road obstructions or expensive disassembly and assembly of control equipment and road furniture during the moving of loads, aggregates, etc. It no appropriate landside infrastructure is in place, there are hardly any alternatives.

Advantages of this transport technology:

relief of the transport load on land routes, large awkward goods can be transported easily because it is not necessary to disassemble the transported goods or traffic facilities, can function as a crane to move heavy goods in a tethered state, goods can be transported over rough terrain economically, cost reductions resulting from the fact that t is not necessary to develop transport infrastructures which often can no longer be expanded or which are too expensive, provision of economical aerial transport compared to airplanes and heavy-load helicopters, loads or systems (e.g. for observation) can be kept stationary over a site for long periods, can be combined economically with other common carriers (e.g. sea transport), increases in the demand for transport in the future can be brought under control, this transport can be implemented with low pollution, i.e. on an environmentally compatible basis, the unique features of this technology provide opportunities for a new industry and sustainable skilled jobs.

In addition, on account of improved efficiency the focus is towards unmanned remote control.

The concept envisions a modular design:
1. Lifting unit module (FIGS. 1 and 2)
2. Drive and equipment modules (FIGS. 1 and 2)
3. Transport module (FIGS. 1-5)
4. Crane module (also FIG. 5).

The modules can be separated from one another mechanically and combined in different ways with certain restrictions. This results in several applications for the aerial transporter, the basic variations of which are presented below.

Description of the Modules and Systems

Lifting Unit Module of the First Embodiment of the Transporter

The lifting unit of the aerial transporter consists of at least three rigid cells connected in series (sections in barrel, toroid, and hemispherical shapes) into which gas bags can be placed. In this regard the bow and the stern are designed as hemispheres with a radius of about 20.6 m, while the cylindrical middle part—or a pre-determined large number of these barrels—has the same radius and a cylindrical length of e.g. 14.3 m. The bow has a conical point (nose) of 2 m in length. As a result, the length of the lifting unit module is at least around 57.5 m. The diameter and the cell structure are borrowed from the "Hindenburg," Zeppelin airship LZ 129, of the thirties.

The supporting structure for the bow and stern, which is made of stringers (horizontal connectors) and frames (annular struts), but also every barrel is covered externally with an aerodynamic sheeting (possibly for advertising). Several lifting gas bags are housed within the cell structure. The lifting gas bags are customized in such a way that when filled to their maximum possible filling pressure, they completely fill the interior of the cells/barrels. The goal is to fill the bags with hydrogen ($H_2$), however for the time being helium (He) can be used until a certification of airworthiness is obtained.

This design involving internal lifting gas bags allows the expensive (weight, energy for exhauster, costs) ballonet design to be waived. The intermediate space between the lifting gas bags and the exterior skin/sheeting, the cell jacket, in which the lattice structure of the cells and, if necessary, the pipe system to fill the gas bags, are located, can be utilized both as a safety zone as a result of fan ventilation to prevent detonating gas where hydrogen is used as well as to provide for additional lift as a result of the heating of the lifting gas by means of heated air where helium is used.

The toroid cells are modular parts of the main supporting structure. They interlock with one another and convey, via the resulting half-timber structure, the lifting force originating from the bags to "nodes" to which a drive module and a crane tackle module or load module are connected. This support structure resembles a half-timber structure (lattice structure), the separating walls between the sections/barrels do not have to be closed because the interior is filled with gas bags made of high-density, high-strength industrial textile.

The frames, stringers, and nodes are made of lightweight materials with high specific load bearing capacity, like carbon fibre structures, or innovative materials like foamed aluminum, with smooth, strong surfaces. Should that material not be available, one can fall back on the Al and Mg alloys proven in aviation. Ideally, the material has good electrical and thermal conductivity, which would facilitate the operation of the transporter and its lightning protection.

The elements/materials can be connected to one another by means of the jointing processes familiar to technicians, for example also by means of laser welding technology, riveting, gluing, etc.

Every barrel or toroid is bounded in its width by an annular frame; from frame to frame it is covered externally with a strong and very light sheeting which in normal cases has only aerodynamic, thermal, and advertising functions. The interior side of the frame-stringer-lattice structure should have a membrane for mechanical protection of the lifting gas bags (abrasion against the supporting structure).

In this way every two frames form a main frame (main ring) of a barrel. The frames of adjacent barrels interlock together in a suitable manner on two axes, e.g. in accordance with the tongue and groove principle, with complementary component design and are firmly coupled together mechanically on the third axis (longitudinal axis of the ship) (e.g. bolting in the area of the node structure). In this way every barrel represents a module, these modules being strung together in a predetermined number corresponding to the desired carrying capacity of the transporter and in this way producing the lift module (together with the bow and stern).

Ring lines are placed within the lattice structure of the lift module—and also of the individual barrels. The various lifting gas bags are attached to these ring lines in order to ensure the filling and extraction of the gas. They have corresponding suction and pressure nozzles to supply and discharge the lifting gas (pressure equalization system, weight equalization system, balance system).

The lifting unit assembled in this manner has an added flat point on the front side to improve the aerodynamic flow, to lead the wind loads to the cell shell and to accommodate any planned means of anchoring to a mast.

In the lower area of the cylindrical barrels—of the middle part of the transporter—the cell structure can be conical or pyramid-shaped with the point facing down. The keel modules described below, like a crane tackle module, can be attached to the end of this point. The entire forces occurring (lift of the module and wind load) must be transmitted into the lattice structure or the keel modules respectively via this "adapter point."

Drive and Equipment Modules

The lifting unit module would have to accommodate, for example, 4 to 6 winding-up and unwinding devices (winches) for the arrester and anchoring cables in the "equator area" (largest lateral expansion and, therefore, best maneuvering point) for setting down a load or for the locking of a tethered balloon. These are needed to practically incorporate the rigging on the ground because personnel cannot attach anchoring cables to the aerial transporter at a height of more than 30 m during landing. This and other tasks are transferred to the keel modules.

Depending on the number of barrels in the lift module, 2, 3 or more drive modules as well as parallel and simultaneously transport and crane modules can be used along with these barrels.

In one embodiment a rigid but easily detachable drive module is mounted to the cell structure in the middle section under the lifting unit module. In addition, the drive module has a structure designed complementary to the frames or nodes or the adapter points respectively, for example an automatic hydraulically engaging latch for a counterpart on the drive module. Depending on the specifications and the degree of automation, however, one module can be bolted to another.

A keel-building drive module is approximately 2-3 m high, about 25 m wide on the underside and around 20 m long. The side facings are matched to the lifting unit on an incline while front and back the facing is streamlined to the cell structure. The bottom is designed as a reinforced load crossbeam to which a transport module can be attached.

The keel space created in this way between the exterior facing, the cell structure, and the bottom of the drive module must incorporate: the power units (or gas turbines) internally in direct proximity to the outliers with the propellers, including the air intakes and outtakes, an auxiliary power unit (fuel $H_2$ or kerosene) with suitable generators for the planned energy provision, the related air intakes and outtakes, the energy distribution systems and wiring, possibly units to heat or cool the lifting gas bags, $H_2$-liquid gas containers or pressure containers, ballast tanks, pumps, compressors, pipes and lines, cables and drums with drive systems for landing and anchoring to the ground, computers and control system, measurement system, communications system, observations systems, fire extinguishing systems, raw materials and supplies, removable parts, as well as any maintenance walkways. The systems and equipment require the necessary holding brackets and installation spaces. In this regard attention must be paid to the interaction between safety and accessibility for assembly and repairs.

A fundamental element in the interior of the drive module is the need for space for the inward projecting point (adapter) to accommodate the crane tackle. Consequently, the drive module accommodates the entire operational equipment and encloses the units which must always remain on the lifting unit module. The dimensions are based on space requirements so that in this case the technicians can make corrections or adjustments. Moreover, it must meet the necessary requirements with regard to strength and force transmission, for the actual transport module or a crane module will be mounted to the bottom of the drive module. In this regard the adapter for crane operation, which can absorb a large amount of force in any case, can definitely be mounted on the transport module, which saves structural weight in the drive module.

Outliers (pylons) which carry the propellers—which can expediently swivel 90 degrees—are mounted outside on the module.

Transport Container Module

Various special modules which can be equipped for very different operational sectors can be mounted under the drive module The aerial transporter described here is conceived primarily as a load transporter and a flying crane. A transport module which can accept as large a transport volume as possible is planned for the transport of loads. A useful load of approximately 20 t is planned as the standard size where the cargo is very awkward to handle. In this regard the upper edge of the module is determined structurally in the main by the configuration of the bottom of the drive module.

As already mentioned above, the bottom of the drive module can be designed structurally so that the transport container can be safely placed in it by means of mechanical automation. The practical design of a container (shape, equipment) is known from the state of the art, for example from CargoLifter containers.

Furthermore, the transport container must accommodate the ballast tanks so that freight weights are balanced and trimmed correspondingly. It is assumed that very light, strong materials will be used.

Crane Tackle Module as an Alternative to Transport Module

In order to operate the aerial transporter as a tethered flying crane (air crane), a crane tackle module is used. This module contains the following parts:

- steel hawser between crane adapter and attachment node of the anchoring hawsers
- 3 or 4 anchoring hawsers
- 3 or 4 winches which take up and move the anchoring hawsers
- crane cab with operating controls for crane functions winch controls and radio controls for the lifting unit functions to be maintained during crane operation.
- crane winch with crane cable, corresponding rollers and equipment to tie down the load (e.g. hooks).

By changing the length of the anchoring cables the attachment nodes for the load to be lifted by the crane can be moved both horizontally as well as vertically in a defined area in every position. Moreover, the design of the anchoring must be looked at more closely, whether one operates with 3 or 4 anchoring cables and winches depends essentially on the statistical determination of the possible operational scenarios. On the one hand, where 3 cables are used, the weight of the tackle and the material used may be kept somewhat lower; on the other hand, from a programming point of view control is more complicated. In addition, it may be more advantageous to use four anchoring hawsers with somewhat lower strengths.

The flying crane is operated entirely from the ground. On-board observation can be made possible by means of appropriate camera technology and radio communications. The crane winch must also operate on the ground so that its weight does not reduce crane performance and the energy supply for the winch drive can be implemented relatively easily. The functioning of such a crane module is known from the state of the art.

Drive System

Market-proven propeller turbines-engines (turboprops) are used for the drive with the proven fuel kerosene. With regard to the rotational speed sector, primarily helicopter engines are considered because the gears can be designed more lightly and with fewer losses.

As the pylons (outliers to carry the drive units) along with the enclosed propellers attach to the drive module, the engines should be installed within this module in close proximity in order to produce a mechanical (via gears and propeller shaft) or a hydraulic transmission of the engine output to the propellers. The propellers on the outliers must be designed to swivel so that the rising and sinking of the transporter can be supported dynamically. However, it could be advantageous to forego the swiveling of the propellers and, instead, to provide another pair of propellers for vertical movement.

The propellers should be able to rotate on the pylons, namely more than 90 degrees because not only starting and landing can be supported by the vertical positioning of the propellers and the corresponding positioning of the blades but also the dynamic descent and altitude stabilization in horizontal flight. Controlling lifting solely through gas management would take too long.

An independent auxiliary engine to supply reserve or replacement energy (APU) which might also be used to cool the gas cells and to heat the jacket (removal of snow and ice), is planned, as already described. In addition, it also serves to start the engines and possibly also to heat the jacket or the barrel materials respectively prior to starting (increase in lift). The APU takes over the supplying of on-board electricity during starting and landing if the cruise engines are switched off and as well on the ground or when operating as a tethered crane if no other external on-board supply is available. As a result of the illustrated significance of the APU and of the required redundancy, the objective should definitely be to use two units.

Operational Concept Freight Transport

Parking on the Ground and Loading

The aerial transporter is designed to be anchored to the ground by means of anchoring cables in the front area of the drive module. By regulating the ballast appropriately it can be kept suspended several meters above the earth. Spring-mounted support skids or wheels installed for parking serve as impact protection on the ground. The suspended state is maintained automatically through regulation of the ballast water, i.e. for example, gas losses are compensated with water discharge. Consequently, the transporter automatically rotates in the direction of the least wind resistance.

For operational parking and operations on the ground four anchoring cables are lowered by appropriate winding devices—optimally from below the equator of the lifting unit module. These are coupled to mobile winches or vehicles which pull the aerial transporter firmly to the ground and anchor it. In correspondence with the ballast load, the anchoring forces are only a few 100 kg. As a result the bottom of the transport container module (container for load) can be put down directly on the ground.

This type of tying-down is also considered for strong-wind situations, in which case further anchoring hawsers must be provided at practical heights on the transporter (for example on the drive module).

If the aerial transporter is to be loaded, the doors or cargo hatches of the transport module are opened making it possible to drive the load directly into the transporter. The loads can either be placed on the bottom of the container and secured, or they can also be attached to the overlying drive module or to the crane adapter. Then the ballast water which has been adjusted for the empty condition of the container is discharged until the quantity required to start is reached, i.e. the useful weight is equalized through ballast reduction 1:1.

Starting—Example

The aerial transporter starts by increasing its lift. The lift is produced by the following measures:

filling of the lifting gas bags up to lift-off which is sufficient to maintain hovering, including dynamic lift to 500 to 600 m.

heating of the lifting gas (gas-dynamic increase in lift) through the introduction of hot air (derived from a compressor level of the drive unit or of the APU) into the jacket (intermediate space between the interior membrane and the exterior skin) of the lifting unit module. The jacket can also automatically heat up from strong sunlight alone in which case hot air may be introduced only on the side not facing the sun. Moreover, the hot air introduced into the jacket of the drive module contributes to the increase in lift as with a hot-air balloon.

supporting the lift through vertical positioning of the propellers or special vertical drive units.

If there is still ballast water in the tanks, it can be reduced to the required increase in lift (in fact, the maximum freight load might even be limited by this reserve).

When the necessary lift force is reached, the anchoring cables on the ground are disengaged and rolled up on the drive module and the transporter floats to its traveling altitude.

The state of "lighter than air" is assumed, if possible, for the start phase whereby the vehicle floats up alone on the arrester cable until the engines can be switched on without running the risk of dust and particles being whirled up, which can lead to damage.

Upon take-off, the heating process to increase lift is shut down and upon reaching the required minimum altitude, the drive is set in the horizontal direction or switched on. The ballast-water production on board must now reduce the lift again and equalize fuel consumption. Some lifting gas might also have to be discharged for support if it cannot be removed from the lifting gas bags as fuel in any case.

Landing and Unloading

When the aerial transporter reaches its destination, it starts to position itself precisely and lets down the arrester cable which first produces a balance in potential at ground level and then is connected to the ground by means of a winch. The latter then pulls the aerial transporter down until the lateral attachment cables can be connected to the relevant ground winches. The important thing is that this is done with the engines switched off so that no parts are whirled up into the air and nobody is injured.

If the aerial transporter is brought close to the ground in this way, the four anchoring cables are unwound from the lifting unit module. The anchoring cables are connected to suitable towing units and the transporter positioned precisely at its setting-down destination and pulled firmly to the ground. Both mobile (mounted on motor vehicles) or stationary cable winches can be used as well as, if necessary, only motor vehicles (pulling apart of the anchoring cables).

The doors of the loading ramps of the transport container can be opened and the freight exchanged. If there is no return freight, ballast water must be taken on. If no water is available, the container can be filled with sand or another suitable material.

Operating Concept Flying Crane

Approach and Operational Preparation

The transporter to be used as a flying crane travels independently to the site where it is to be used and initiates the landing process. For that purpose it lowers the arrester cable from the drive module. The transporter is pulled close to the ground on the arrester cable. The anchoring cables are then unwound from the lifting unit module and connected to winches or a heavy motor vehicle on the ground. In this way the transporter is pulled firmly to the ground, if possible right at a site where the drive and transport modules can be set down.

The drive module is separated from the lifting unit module whereupon the anchoring cables are slackened somewhat so that the lifting unit module can be lifted off its keel module and moved slightly to the side. Now the crane tackle, which might even have been transported in the transport module, is attached to the crane adapter of the lifting unit. The crane cable is attached to the attachment node by means of a roller or a roller system (rope and pulley) and fed to the crane winch on the ground. The anchoring hawsers of the crane tackle now take over the tethering of the lifting unit together with the operational winches somewhat outside of the working site. The anchoring cable and arrester cable are released and rewound. Instead of a transported crane tackle, a separate crane module can also be used which, like the transport module or the lift module, can be connected to the lifting unit.

The flying crane is then ready for operation.

Method of Operation of the Flying Crane

Once the preparation of the flying crane is completed, the lifting unit is placed at the operating altitude over the working site by slackening the anchoring hawsers. By means of this single-axis suspension, the lifting unit can turn aerodynamically into the wind and depending on the wind strength, move out of the perpendicular from the attachment node, which in turn remains mainly at rest as a result of this type of suspension.

Through appropriately programmed retracting and letting out of the anchoring hawsers the flying crane can be moved in a defined operating area, take up loads, move them horizontally and set them down again.

As the lifting unit can also be moved vertically by means of the anchoring hawsers, test and experiments can be carried out so that the crane winch and the crane cable rollers might be done away with. The attachment equipment placed on and suspended from the attachment nodes is moved downward through coordinated drawing in of the anchoring hawsers, the load is attached and by means of coordination of the four anchoring hawsers the lifting unit raises the load.

While the winches which control the anchoring hawsers require a firm grounding on foundations or on heavy vehicles, the operating area does not have to be braced, i.e. the flying crane is especially suitable for building sites on which one cannot work with heavy equipment or only with difficulty. The four winches must take on the lifting force of the lifting unit plus the maximum wind load less its own weight and that of the crane tackle.

The winches, also the crane winches, must be adequately grounded to equalize the potential and to dissipate any discharge shocks.

Figure 3:
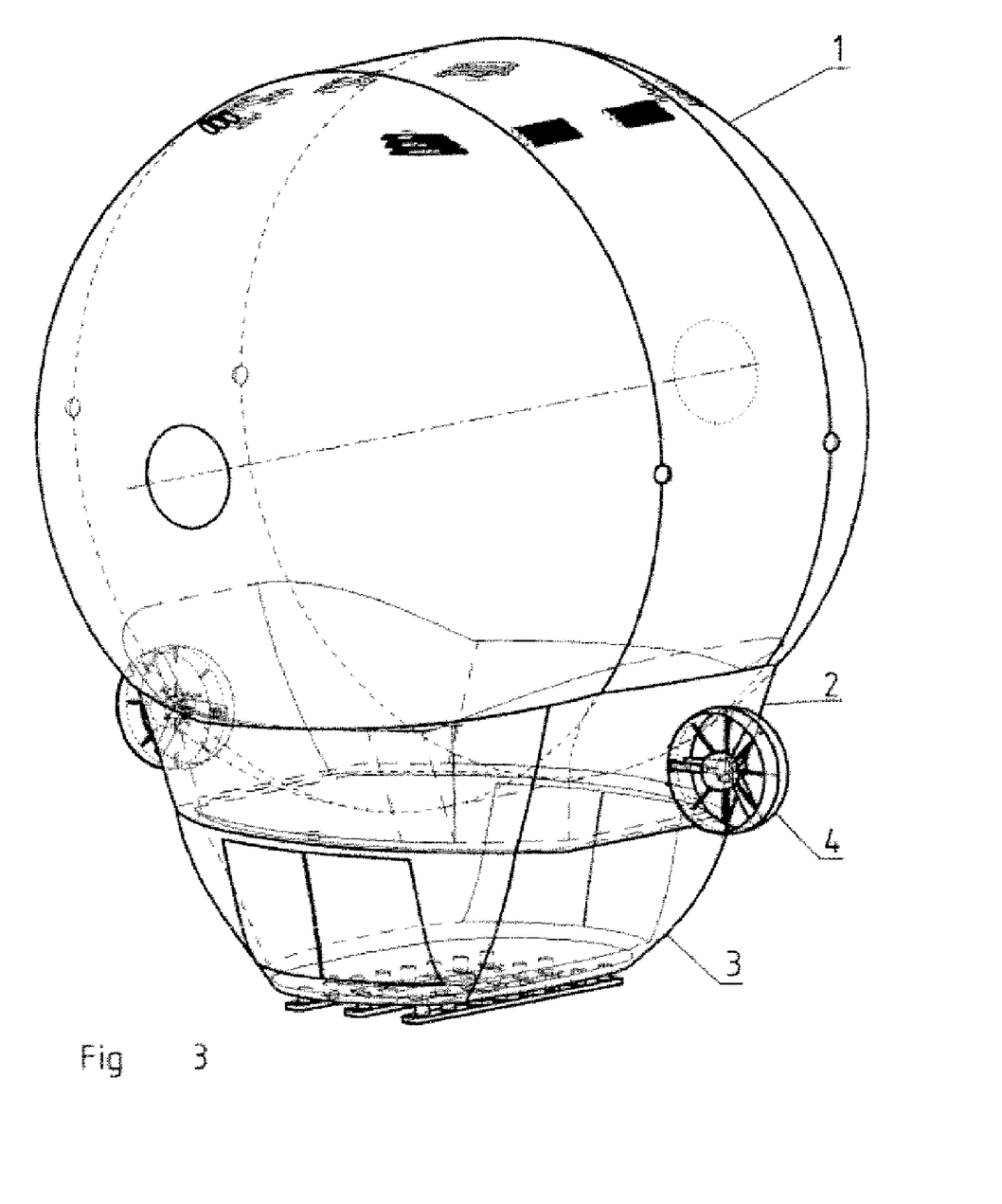
FIG. 3 a perspective front view of the complete transporter analogous to FIG. 2.

FIGS. 1 and 2 show lateral and front views of the aerial transporter separated into modules 1-3. FIG. 3 shows the aerial transporter, the lifting module 1 connected with the drive module 2 and load module 3.

Figure 1A:
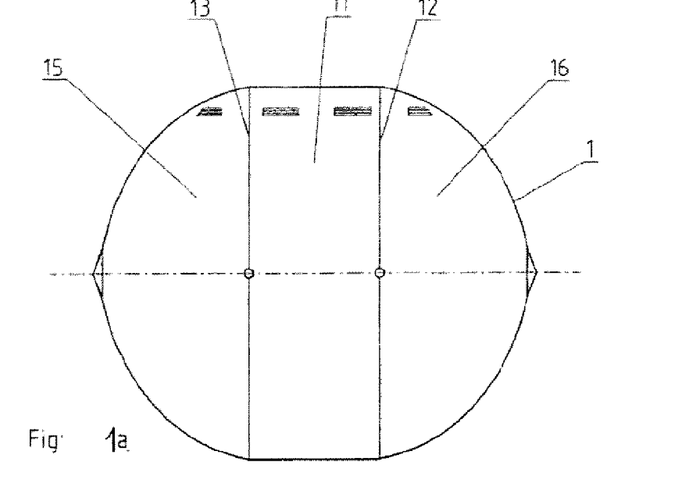

FIG. 1a shows the simplest variation of the aerial transporter with lifting module 1 with a barrel 11 as module connected to the front frames 13 and the rear frames 12 with bow 15 or stern 16 respectively. The barrel 11 is covered with a textile cover 14 between the frames 12, 13.

Figure 1B:
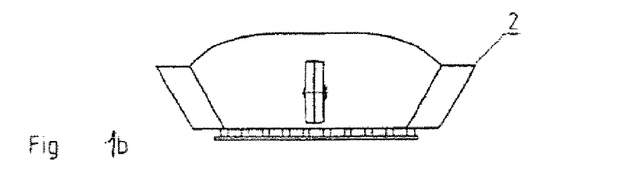
Figure 1C:
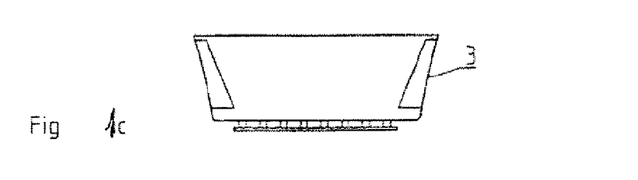
Figure 1D:
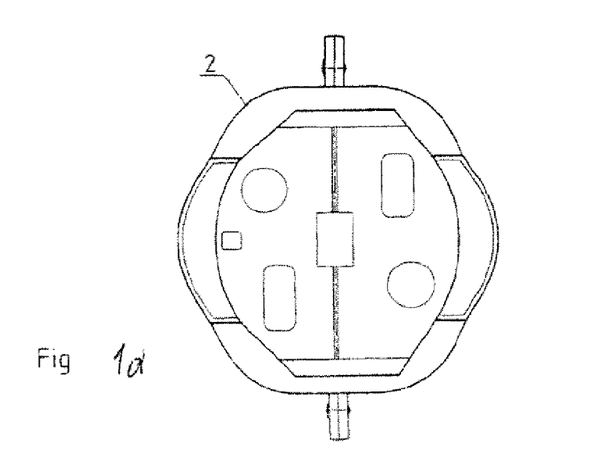
Figure 2A:
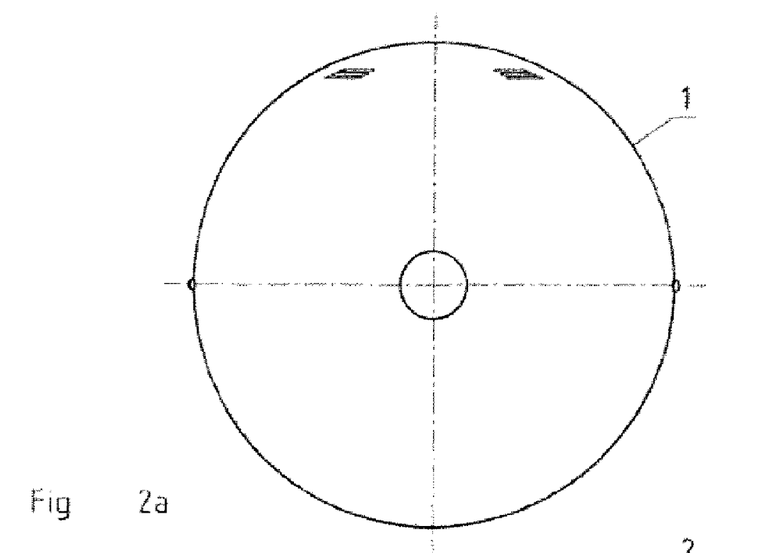
Figure 2B:
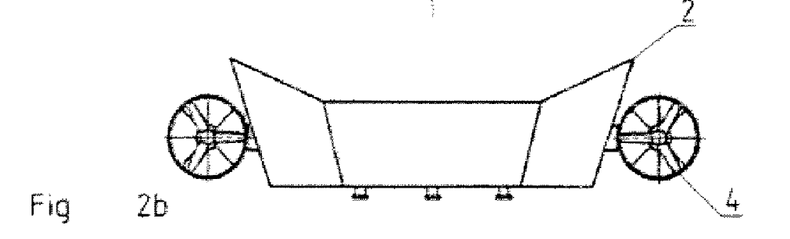
Figure 2C:
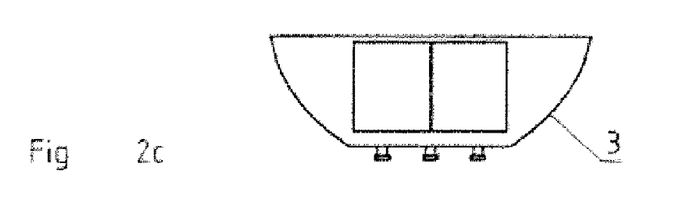
Figure 2D:
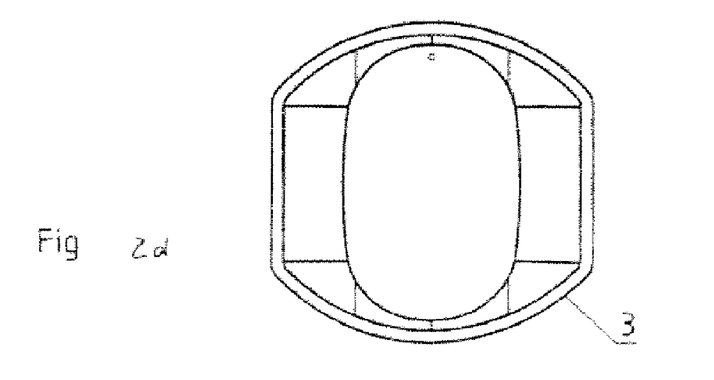

FIG. 1b shows the drive module 2, FIG. 1c the load or transport module 3 in lateral view and in top view in FIG. 1d.

FIGS. 2a to 2d show a front view of the transporter analogously to FIG. 1.

Figure 4:
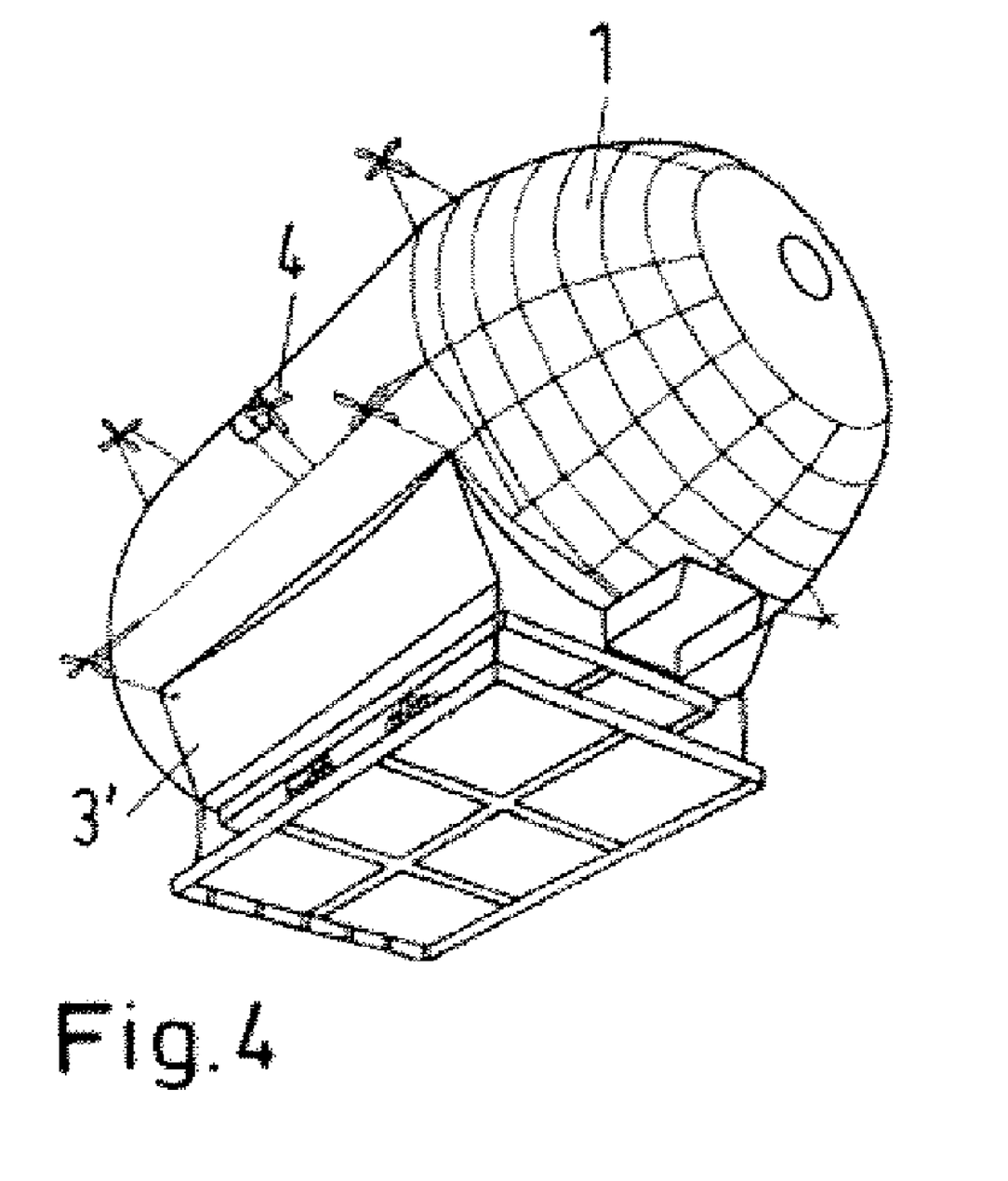
FIG. 4 an aerial view of a further embodiment of the transporter.
Figure 5:
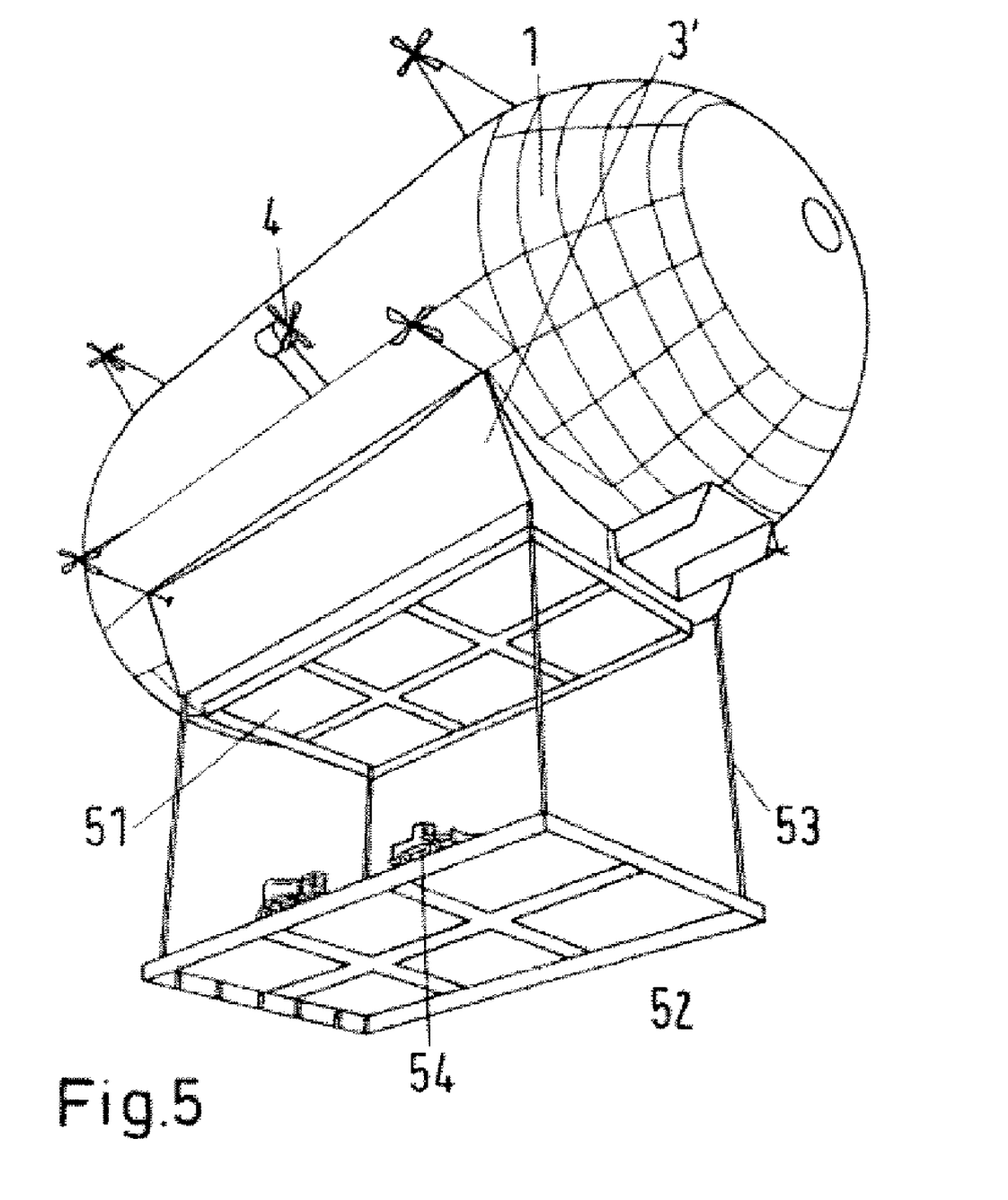
FIG. 5 a view of the transporter in accordance with FIG. 4 during the landing approach.

FIGS. 4 and 5 show an alternative embodiment of the transporter compared to that shown in FIGS. 1-3 with several annular cylinder parts; a transporter with correspondingly higher lift and higher load capacity. The drive units 4 can be attached to the lifting unit 1 by means of pylons and the transport module 3 flange-mounted on the lifting unit as a keel has a platform 52 for containers or, as illustrated, for trucks 54 which can be lowered from the module base 51 on cables 53.

During landing, loading and unloading a well-thought out ballast management and lifting gas management is used in order to adjust the lift of the transporter.

The invention claimed is:

1. Aerial transporter having rigid cell structures (1) which are covered with light materials as a skin (14) composed of modules, comprising two approximately hemispherical elements (15, 16) for bow and stern, at least one annular section (11) as modular element, and a transport or crane module (3, 3') arranged as a rigid keel of the aerial transporter under the lifting module, wherein the elements can be locked to a lifting module at their edges in accordance with a tongue-and-groove principle with positive locking in two axes and by appropriate joining means in a third axis.

2. Aerial transporter in accordance with claim 1, characterized in that drive units (4) being assembled in a drive module (2) as a keel module.

3. Aerial transporter in accordance with claim 1, characterized in that the annular section (11) is formed approximately as a toroid, wherein at least two frames spaced apart by stringers forming stable rings, the edges of which are formed in a complementary manner to establish positive locking with adjacent frames.

4. Aerial transporter in accordance with claim 1 or 2, characterized in that the hemispherical and/or central elements (1, 15, 16) can be filled with gas bags or ballonets the volume of which can be designed to vary.

5. Aerial transporter in accordance with one of the preceding claims 1-3, characterized by the drive units (4) and feed devices of the drives for fuel are designed such that hydrogen can be used both as lifting gas and as fuel.

6. Aerial transporter according to one of the preceding claims 1-3, characterized in that the cell structures (1) are made at least partially from lightweight materials.

7. Aerial transporter in accordance with one of the preceding claims 1-3, characterized in that it is unmanned and that the cycle of landing, starting, loading and unloading can be at least partially remote-controlled.

8. Process to start or land an aerial transporter in accordance with one of the preceding claims 1-3, characterized in that its lift can be controllable by heating or cooling of at least parts of the lifting module (1) and/or gases at and in the lifting module.

9. Use of an aerial transport in accordance with one of claims 1-3, as a temporarily stationary crane by decoupling the transport module and by tying the transporter to fixed anchor points on the ground by means of on-board winches.

* * * * *

UNITED STATES PATENT AND TRADEMARK OFFICE
CERTIFICATE OF CORRECTION

PATENT NO. : 8,152,092 B2  Page 1 of 1
APPLICATION NO. : 12/095385
DATED : April 10, 2012
INVENTOR(S) : Zulkowski et al.

It is certified that error appears in the above-identified patent and that said Letters Patent is hereby corrected as shown below:

Column 2, line 42, reads "during the moving of loads, aggregates, etc. It no appropriate"
should read -- during the moving of loads, aggregates, etc. If no appropriate --

Column 2, line 53, reads "cost reductions resulting from the fact that t is not nec-"
should read -- cost reductions resulting from the fact that it is not nece- --

Column 3, line 26, reads "the "Hindenburg," Zeppelin airship LZ 129, of the thirties."
should read -- the Hindenburg," Zeppelin airship LZ 129, of the Thirties. --

Claim 1:

Column 9, line 42, reads "1. Aerial transporter having rigid cell structures (1) which"
should read -- 1. Aerial transporter comprising a lifting module having rigid cell --

Column 10, line 1, reads "modules, comprising two approximately hemispherical ele-"
should read -- composed of lifting modules, comprising two approximately hemispherical ele- --

Column 10, line 2, reads "ments (15, 16) for bow and stern, at least one annular section"
should read -- for a bow and a stern, and at least one annular section (11) --

Column 10, line 3, reads "(11) as modular element, and a transport or crane module (3,"
should read -- as a modular element, --

Signed and Sealed this
Twenty-ninth Day of May, 2012

David J. Kappos
*Director of the United States Patent and Trademark Office*